UNITED STATES PATENT OFFICE.

WILLIAM NEALE CLAY, OF CONSTANTINOPLE, TURKEY.

IMPROVEMENT IN MANUFACTURING MALLEABLE IRON DIRECTLY FROM THE ORE.

Specification forming part of Letters Patent No. 4,103, dated July 5, 1845.

*To all whom it may concern:*

Be it known that I, WILLIAM NEALE CLAY, late of Flimby, in the Kingdom of Great Britain, but now residing at Constantinople, in Turkey, have invented or discovered certain new and useful Improvements in the Process of Making Iron, by which improvements I am enabled to obtain malleable iron directly from the ore—that is to say, without subjecting such ore to the customary operation of smelting in blast-furnaces, as usually adopted, for which improvement, in part, I obtained Letters Patent in England under date of the 31st day of March, in the year 1841; and I do hereby declare that the following is a full and exact description thereof.

In manufacturing iron from iron ore, as at present generally practiced, the ores are first roasted or calcined, then smelted in blast-furnaces, and subsequently refined and puddled in order to its conversion into iron. It has been proposed, however, to manufacture wrought or malleable iron more directly from the ore without the aid of blast-furnaces; and among other processes for so doing is that for which I obtained Letters Patent in England, dated on the 19th day of December 1837. The process therein described consisted of a mode of treating rich iron ores in closed vessels, and this mode of treatment has been found fully to answer the purpose intended; but my present plan differs essentially from that made known in said Letters Patent; and it consists in the manufacturing of malleable iron by treating the rich ores of that metal with carbonaceous matter in the ordinary puddling or reverberatory furnace. I am informed and believe that attempts had been made to effect this object before it was successfully practiced by me; but such attempts were altogether unsuccessful, and were consequently abandoned. By my process I am enabled in a very short space of time to manufacture wrought or malleable iron from the richer kinds of ore—such as the hematitic, and others which contain not less than forty-five per cent. of metal, and which generally contain a considerably larger quantity—my process not being considered as adapted to the earthy ores, or to any of those which contain a less percentage of iron.

Before proceeding to give the particulars of my process I will remark that the invention herein described is the result of a series of experiments by which I have ascertained that the attempts heretofore made for converting the richer iron ores into malleable iron by means of carbonaceous matters in reverberatory furnaces have failed, principally from a want of knowledge of the effect of carbonaceous substances, when so employed, as regards quantity, the proportion added to the ore having been much too small to answer any good purpose, as it was not capable of deoxidizing any considerable portion of the ore, and the means attempted were not such as would practically prevent such small quantity from being again oxidized by the working of the reverberatory furnace. Although I do not claim, therefore, to be the first who has made the attempt to manufacture malleable iron from the ore in a reverberatory furnace, I do claim to be the first to have discovered the cause of former failures, and to have devised the means of rendering the process successful.

In reducing the kinds of ore referred to, which consist principally of the protoxides and peroxides of iron, I have discovered that not less than from twenty to forty per cent. of carbon, by weight, and in many cases more, should be mixed with the ore when it is to be reduced in a reverberatory furnace; and I exclude from the list of those which are to be so treated all such as do not contain a sufficient quantity of oxygen to require the lesser proportionate quantity of carbon above named. It will be seen, therefore, that my process applies to that class of ores which, under the ordinary mode of treatment, are deemed refractory, these being the most available when subjected to the process invented by me. With the several ores that I employ the actual quantity of carbon or of carbonaceous matter required will vary considerably, although it will always be equal in amount to that above stated; and I will hereinafter give such information as will enable the workman to judge readily when he is using the proper relative quantity for the iron ore upon which he is operating.

I commence my process by taking any of the rich iron ores, including under this denomination those only which will yield forty-five per cent. and upward of that metal, either as they are obtained from the mine or as they exist after the carbonic acid or other volatile matter which they may contain has been separated from them by being calcined or roasted, and which, when so operated upon, will contain that percentage or more of iron by analysis. By means of millstones, rollers, or any other suitable apparatus I crush or pulverize the ore which I am about to reduce into particles sufficiently small to pass through a riddle or screen the meshes of which measure from one-fourth to one-eighth of an inch, preferring the smaller size. To one hundred parts of the ore or calcined iron-stone so reduced in size I add from twenty to forty parts, and frequently more, of carbonaceous matter—such as coke, charcoal, peat, or anthracite—which has been in like manner reduced to powder and passed through a sieve or screen of the smaller size mentioned, and after well mixing them together I pass a charge thereof, usually of about five hundred pounds weight, into a puddling or reverberatory furnace, which may be of the ordinary construction and heated in such manner as to be in a state suitable for receiving pig-iron to be puddled. This mixture should be occasionally but moderately stirred up—say every five or ten minutes—and after some time, dependent upon the heat of the furnace as well as upon the particular ore under treatment, it will become pasty. Under ordinary circumstances this takes place in about half an hour, pastiness resulting from the hotter parts having become metallic and adhering or welding together. The furnace is then to be brought to its greatest heat and the charge balled; but the iron must be previously kept as open as possible, and care must be taken that it be not balled up too soon; otherwise it will be tender and most probably redshort. In about an hour and a half or two hours from the time of charing, if the furnace be properly constructed, the fuel good and well managed, the charge will be ready for the hammer, and may be treated as puddled iron made on the customary plan.

It will be obvious from the remarks already made that the definite quantity of charcoal or of other carbonaceous matter cannot be prescribed without taking into account the exact quantity of oxygen contained in the ore or calcined iron-stone, and of the quantity of carbon or of carbureted hydrogen supplied by the carbonaceous matter employed; but from my experience I would recommend as an approximate rule that where a hundred parts of the ore under treatment contain about fifty of metallic iron about thirty parts of charcoal, or its equivalent in other carbonaceous matter, be added thereto, and for every additional two parts of iron in one hundred of the ore I would add one part of carbonaceous matter.

The economy of the process will be promoted by the use of a double chamber in addition to the ordinary puddling-furnace. The second chamber, or what may be called the "preparing furnace," is to be formed over or at the end or the side of the ordinary puddling-furnace, so that a charge of the mixture placed in the additional or secondary chamber may be getting heated during the time of operating on the charge in the puddling-furnace. In this case the flame from the puddling-furnace, instead of passing therefrom directly into the chimney, is to be conducted through a suitable opening or flue into the secondary chamber, which may in its general construction be similar to the puddling-furnace. When this secondary chamber or preparing-furnace is at the end or alongside of the puddling or reducing furnace, it should be placed on a higher level than said furnace, as the flame may in this case be made to operate more efficiently in it, and the ore is more readily scraped from it into the puddling-furnace. This secondary furnace may have an opening or hole in its top, through which the mixed material may be gradually fed as found convenient. The flame, after having operated in this furnace, passes into a chimney in the usual way.

I do not make any claim to the arranging of two furnaces so that the flame, after operating in one, shall pass therefrom into the other, but have described this arrangement on account of its economizing the heat by heating and partially preparing the mixture as above stated; and I will further add that with some of the ores containing volatile matter it may prevent the necessity of a previous calcination or roasting. Such calcination or roasting may, however, if desired, be previously effected in an open kiln, like a lime-kiln, by placing therein alternate layers of the ore and of charcoal, as is now practiced in some iron-works.

I have sometimes combined with my process of reducing the ores of iron in the puddling-furnace the additional operation of bringing pig, plate, or other cast iron into the state of malleable or wrought iron by adding portions of such cast-iron to the mass which is being acted upon. This pig or cast iron, which is a carburet of that metal, not only assists in the reduction of the oxide of iron still remaining in the ore, but has its own carbon separated by the oxygen of the ore. I prefer to add the cast-iron when the charge of the ore begins to feel heavy or pasty. When the cast-iron is thoroughly melted and well incorporated with the ore the action of each material on the other so rapidly quickens the process that some difficulty is experienced in preventing its being balled too soon; but, as before stated, the mass should be kept "open" at a high degree of heat. Thus not only does the addition of cast-iron increase the production of malleable metal with a given cost of time and labor, but it also, from causes scientifically accounted for, operates as a desirable adjunct in facilitating the process.

I do not name the relative proportions of ore and of cast-iron, nor do I limit myself to the time of adding them together, as these conditions may be varied at the will and according to the experience of the operator; but it is best to use a smaller proportion of cast-iron when a very pure ore is being acted upon, or the quality of the wrought-iron may be injured in some slight degree.

The workman will after a little experience be able to determine whether the requisite proportionate quantity of carbonaceous matter has been added to the particular species of ore under treatment by paying attention to the following particulars: First, if in the working of a particular description of ore the return of iron be deficient in yield with reference to its known contents by analysis—say less than from two-thirds to three-fourths thereof—and that a larger proportion of slag or cinder runs from it than might be expected, and if all appearance of the presence of carbonaceous matter vanishes at an early stage of the process, there is manifestly a deficiency of carbon, and it must be increased in working the subsequent charges; secondly, if the return be good, but the metal does not ball up readily or stand the hammer well, and if a considerable portion of the carbonaceous matter be seen floating on the molten cinder at the close of the operation, there then is too much carbon in the mixture, and in future charges its quantity must be reduced; thirdly, if the cinder be moderate in quantity, if the iron ball up readily, if the carbonaceous matter disappear about the time of balling up, and the bloom stand the hammer well, the proportions may then be deemed correct.

Having thus fully described the nature of my improvement in the manner of reducing those ores of iron which yield forty-five per cent. and upward of that metal, and having also shown the manner of performing the same, what I claim therein as new, and desire to secure by Letters Patent, is—

1. The mode of manufacturing wrought or malleable iron in a reverberatory furnace, by combining said ores with carbonaceous matters in the proportions herein indicated, and in otherwise treating them, substantially in the manner above made known.

2. In combination with the said process or manner of procedure, the reducing of pig or other cast iron to the malleable state along with the ore, which constituted the original charge, as herein described, this latter claim being specifically limited to the reduction, in combination with the process referred to in the first claim above made.

WILLIAM NEALE CLAY.

Witnesses:
EDWARD SANG,
GEO. ROBOTY.